United States Patent
Buehler et al.

(10) Patent No.: US 12,120,199 B2
(45) Date of Patent: Oct. 15, 2024

(54) CACHABILITY OF SINGLE PAGE APPLICATIONS

(71) Applicant: International Business Machines Corporation, Armonk, NY (US)

(72) Inventors: Dieter Buehler, Tuebingen (DE); Carsten Leue, Sindelfingen (DE); Uwe Karl Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/943,762

(22) Filed: Jul. 30, 2020

(65) Prior Publication Data
US 2021/0092199 A1    Mar. 25, 2021

(30) Foreign Application Priority Data
Sep. 24, 2019   (EP) .................................. 19199212

(51) Int. Cl.
| | | |
|---|---|---|
| *H04L 67/568* | (2022.01) | |
| *G06F 9/54* | (2006.01) | |
| *H04L 67/02* | (2022.01) | |
| *H04L 67/55* | (2022.01) | |

(52) U.S. Cl.
CPC ............ *H04L 67/568* (2022.05); *G06F 9/541* (2013.01); *H04L 67/02* (2013.01); *H04L 67/55* (2022.05)

(58) Field of Classification Search
CPC ..... H04L 67/2842; H04L 67/02; H04L 67/06; H04L 67/568; G06F 9/541
See application file for complete search history.

(56) References Cited

U.S. PATENT DOCUMENTS

| | | | |
|---|---|---|---|
| 5,805,808 | A  | 9/1998 | Hasani |
| 5,931,904 | A  | 8/1999 | Banga |
| 7,788,291 | B2 | 8/2010 | Levow |
| 8,838,678 | B1 | 9/2014 | Weiss |

(Continued)

FOREIGN PATENT DOCUMENTS

| | | |
|---|---|---|
| CN | 106464710 A | 2/2017 |
| CN | 106657249 A | 5/2017 |

(Continued)

OTHER PUBLICATIONS

"What Is Cache Busting?" keycdn.com, Oct. 4, 2018, 2 pages. <https://www.keycdn.com/support/what-is-cache-busting>.

(Continued)

*Primary Examiner* — Emmanuel L Moise
*Assistant Examiner* — Xiang Yu
(74) *Attorney, Agent, or Firm* — Eric W. Chesley (57) ABSTRACT

A computer-implemented method for improving cachability of an API request result of a content delivery system may be provided. The method comprises maintaining a unique seed value per group of content items of a content type, and, upon determining that one of the content items of the group is updated, updating the seed value for the group of content items. The method also comprises caching one of the content items of the group together with the related seed value in a caching system and receiving, by the caching system, an API request requesting as API request result a content item of the group, wherein a parameter of the API request is a selected seed value.

20 Claims, 5 Drawing Sheets

(56) References Cited

U.S. PATENT DOCUMENTS

| | | | |
|---|---|---|---|
| 10,033,826 B2 | 7/2018 | Miller | |
| 10,666,756 B2 | 5/2020 | Baldwin | |
| 2004/0133444 A1 | 7/2004 | Defaix | |
| 2007/0220066 A1 | 9/2007 | Collacott | |
| 2010/0174861 A1 | 7/2010 | Katz | |
| 2011/0078708 A1* | 3/2011 | Dokovski | G06F 9/545 |
| | | | 719/329 |
| 2011/0125775 A1* | 5/2011 | Lance | G06F 16/335 |
| | | | 707/769 |
| 2012/0254949 A1* | 10/2012 | Mikkonen | G06F 21/44 |
| | | | 726/4 |
| 2013/0151657 A1* | 6/2013 | Lehman | G06F 16/951 |
| | | | 709/217 |
| 2014/0201258 A1* | 7/2014 | Jowett | H04W 4/60 |
| | | | 709/203 |
| 2014/0372515 A1 | 12/2014 | Chow | |
| 2015/0100660 A1 | 4/2015 | Flack | |
| 2015/0263977 A1 | 9/2015 | Nair | |
| 2015/0319261 A1* | 11/2015 | Lonas | H04L 67/5682 |
| | | | 709/216 |
| 2016/0092552 A1* | 3/2016 | Morfonios | G06F 16/285 |
| | | | 707/737 |
| 2016/0371296 A1* | 12/2016 | Passey | G06F 16/185 |
| 2017/0046438 A1 | 2/2017 | Desineni | |
| 2017/0085671 A1 | 3/2017 | Hernandez Gutierrez | |
| 2018/0152400 A1 | 5/2018 | Chung | |
| 2018/0246812 A1* | 8/2018 | Aronovich | G06F 12/121 |
| 2018/0260467 A1* | 9/2018 | Stewart | G06F 16/27 |
| 2019/0007515 A1 | 1/2019 | Baldwin | |
| 2019/0182188 A1* | 6/2019 | Nugent | G06F 9/546 |
| 2020/0034050 A1* | 1/2020 | Brasfield | G06F 12/084 |
| 2020/0053511 A1* | 2/2020 | Yamazaki | H04W 4/029 |
| 2020/0201884 A1* | 6/2020 | Chatrain | G06F 16/273 |
| 2021/0064450 A1* | 3/2021 | Nugent | G06F 9/4881 |

FOREIGN PATENT DOCUMENTS

| | | |
|---|---|---|
| CN | 109997129 A | 7/2019 |
| CN | 110062280 A | 7/2019 |
| JP | 10214239 A | 8/1998 |
| JP | 2006506738 A | 2/2006 |
| JP | 2022515836 A | 2/2022 |
| WO | 2004046968 A2 | 6/2004 |
| WO | 2021059113 A1 | 4/2021 |

OTHER PUBLICATIONS

Simpson, "Cache Busting for A More Performant, Usable Web," Dec. 3, 2018, 7 pages. <https://seesparkbox.com/foundry/browser_cache_busting_explained>.

International Search Report and Written Opinion dated Jan. 15, 2021, for International Application No. PCT/IB2020/058812, filed Sep. 22, 2020.

Chinese Rejection dated Dec. 29, 2023, for CN Application No. 202080064853.5, filed Sep. 22, 2020.

Japanese Rejection Letter dated Nov. 21, 2023, for Japanese Patent Application No. 2022-515836.

* cited by examiner

CACHABILITY OF SINGLE PAGE APPLICATIONS

BACKGROUND

The invention relates generally to caching of content in a content delivery network, and more specifically, to a computer-implemented method for improving cachability of an API request result of a content delivery system. The invention relates further to a related caching system for improving cachability of an API request result of a content delivery system, and a computer program product.

The larger the amount of data—in particular so-called unstructured data—becomes for enterprises of any size, the more enterprise data needs to be managed using content management systems. These may be used to store just the ever-growing amount of documents, or also as content creation tool, e.g., for webpages. Also search engines play a larger and larger role in enterprise content management, not only for unstructured documents but also for reports from data analysis systems and other sources.

On the other side, the content items need to be distributed within the enterprise—and partially as well shared with customers and suppliers—and made accessible in a reliant and consistent way, i.e., the documents and other content items need to be available always in the latest version. Thereby, the distribution network, which may encompass also caching systems between the source and the target (often the client system using a browser) should carry the lowest possible burden, i.e., network traffic.

Nowadays, often single page applications (SPA) are used on the client-side, which predominant feature is to work with dynamic content. Such content may be updated as part of a web page, as soon as new information becomes available. Thereby, other content elements of the webpage remain static and may not be updated regularly.

Intermediate caching is highly important to achieve a high-performance client application and at the same time keep the amount of requests (and therefore the load) to the back-end server at an acceptable level. Static immutable resources (like images) are easy to cache by adding corresponding HTTP cache control headers.

On the other side, caching of REst API (REpresentational State Transfer Application Programming Interface) responses is much harder, because the results are typically dynamic, and caching those results based on expiration time results in potentially stale data for the duration of that expiration time. To overcome this limitation, many cloud services today use validation-based caching, by making use of the HTTP "ETag" and "if-not-match" address. This approach allows the average servers (or cache systems) to check if a cache of objects has become stale or by doing a corresponding HTTP request to the origin of the service. This approach avoids transferring the same data repeatedly from the source to the edge server. That's fine, but this approach still results in validation requests to the source server, which typically puts a heavy burden on this server and the network. In addition, the validation itself is often far from trivial, for example, the result of a search API call may depend on a wide variety of metadata being used for filtering by the search query at hand.

Validation based caching is typically hard with an HTTP caching. There are currently no technical means to invalidate a browser cache. Some CDN (content delivery network) cache support invalidations, but CDN cache invalidations are no lightweight operations and take typically a long time to be distributed to all edge servers (i.e., client systems). Furthermore, it is typically not meant to be used on a fine-grained level, like for individual parameterized API calls.

There are several disclosures related to methods for managing content in a content delivery system: Document US 2017/0046438 A1 discloses a search system including a query receiver, a life scrape system and a cache manager. The query receiver is configured to receive a first query related to a first application state of a first application. The first query is requested by a user device. The cache manager is configured to store information based on the extracted content and, in response to the query receiver receiving a second query matching the first query, selectively provide the stored information to the user device for representation to a user.

Document US 2014/0372515 A1 discloses a client-based computer system adapted to communicate with a remote server through a network and to provide access to content or services provided by the server the system includes a storage device and a cache. The cache is adapted to communicate with the server over the network, to intercept a request from the client to the server and to store responses from the server on a storage device. The cache is further adapted to automatically determine when to send the request to the server over the network.

A disadvantage of known solutions still continues to be relatively high network traffic between the different systems involved, i.e., the content server(s), the caching system(s) and the client system(s). This applies particularly to cases in which single page applications provide access to dynamically changing content.

Hence, there may be a need to overcome unsatisfactory situations, namely, unnecessary overhead network traffic in a content delivery network and still provide reliable access to the latest versions of content items using webpages enabling access to dynamically changing content.

SUMMARY

According to one aspect of the present disclosure, a computer-implemented method for improving cachability of an API request result of a content delivery system may be provided. The method may comprise maintaining a unique seed value per group of content items of a content type, and, upon determining that one of the content items of the group is updated, updating the seed value for the group of content items.

Additionally, the method may comprise caching one of the content items of the group together with the related seed value in a caching system, and receiving, by the caching system, an API request requesting as API request result a content item of the group, wherein a parameter of the API request is a selected seed value.

According to another aspect of the present disclosure, a caching system for improving cachability of an API request result of a content delivery system may be provided. The system may comprise means for maintaining a unique seed value per group of content items of a content type, means for updating the seed value for the group of content items, upon determining that one of the content items of the group is updated, means for caching one of the content of the group together with the related seed value in a caching system, and means for receiving, by the caching system, an API request requesting as API request result a content item of the group, wherein a parameter of the API request is a selected seed value.

The proposed computer-implemented method for improving cachability of an API request result of a content delivery system may offer multiple advantages, technical effects, contributions and/or improvements:

The network traffic between the client and the content management system, typically implemented as back-end server in a data center, may be reduced significantly, resulting in a more efficient usage of available resources. The cache system, typically implemented in a communication network between the back-end content server system or content management system and an information consuming device like a client system typically equipped with a browser for rendering the information, may not send unnecessary and uncontrolled requests to the back-end system, but may be enabled to keep the content items cached in the—e.g., distributed—caching system as current as possible. For this, an intelligent communication protocol between the client and the cache system may provide means for controlling the actuality of a content item in the client system.

The cache system may request the content item, in particular an updated version of content item, from the content management system only if it is determined that the content item cached on the cache system is outdated. This may be particularly advantageous in environments where single page applications may be used comprising static as well as dynamically changing content on the same webpage (or web application).

The granularity and control over content items and their actuality may be configured defining groups of content items. This way, a fine-grained or coarse-grained cache management strategy may be followed depending on the available bandwidth of the network between the back-end system, the cache system, as well as, the network capacity between the cache system and the client. Also, this configurability may contribute to the way existing resources may be utilized in a more economical way.

The here proposed new caching approach which makes use of the novel cache seed parameter may allow to cache API responses for infinitive times. To achieve this, related cloud services keep track of the current cache seed values per type of artifacts (i.e., content items) that are exposed by the services (e.g., one cache seed for content and another cache seed for assets). Whenever an instance of such type is created, modified or deleted, the corresponding cache seed value may be updated to a new unique value (that was never used before). Clients may retrieve the current seed value for a given type via a corresponding REst API.

Moreover, this approach may allow users to decide how current the loaded information has to be on the client side. The information is as current as the loaded cache seed value. This means, if the client may tolerate data to be stale for a minute, the client system would re-load the seed values every minute. In times where there are no updates to the life data served by the cloud service (i.e., the content management system), the seed values may not change in subsequent API call and will still be served completely from the CDN cache, i.e., the cache server. This approach may be especially advantageous for sites that are updated at specific times but not necessarily on a reliable stable schedule. This may represent a typical case for web sites. After an update, all client systems will see the current data after one minute longest, while during the long period of no change, all responses will be served by the cache system of the CDN. A client is always free to load the most current data by either omitting the cache seed parameter, or by reloading it.

Furthermore, the load at the back-end server (i.e., the CMS) may be reduced significantly due to often avoided update check from the CDN middle layer, i.e., the cache servers. This may result in better response time for regular request to the back-end servers and less compute power requirements (e.g., potentially smaller, cheaper servers).

In the following, additional embodiments of the disclosure—applicable to the system as well as to the method—will be described.

According to one advantageous embodiment, the method may also comprise: upon determining, at the caching system—in particular, after receiving the API request—a difference between the related seed value and the selected seed value, requesting an updated respective content item as API request result, in particular, from the content management system. If the seed values of the request and the content item on the caching system are identical, the caching system simply returns a seed value stored at the caching system. But over and above nothing is performed because the seed value is unchanged (i.e., identical on the client and the caching system), in particular, not any request may be sent to the back-end system.

According to another advantageous embodiment, the method may also comprise receiving regularly, at the caching system, an API request for the content item of the group. This may be done in order to regularly refresh the content of an SPA in a browser of a client. Regularly may mean "at regular time intervals" or triggered by other events that are received by the client system of the browser. E.g., messages may be received in unpredictable time intervals that belong to the context of the content item; then, automatically, the client/browser may send out a request to the caching system in order to get an updated content item—given the seed value is different. This may be of particular value for dynamic webpages.

According to one useful embodiment of the method, the API request may request as API request result content of items belonging to different groups of content item types. Thus, the above-described mechanism may also be applied to content items of different groups. Also this may be of particular value for dynamic web pages handling different content item types. Hence, a group may represent all content items of one content type of all content items of the CMS, meaning that all content items of one type are in one group. In this case the group may no longer be necessary; one may look at the type only.

According to one permissive embodiment of the method, the parameter of the API request may be a result of an XOR function having the seed values of the different types as input. This may express a straight-forward way to keep the network traffic low because the seed values of more than one seed value may be combined for different content item types. Thus, if two seed values for different content item types have changed, or are requested by the client, the known seed values could be combined by the XOR function applied to the two seed values.

According to an advanced embodiment, the method may also comprise using—at the caching system—as cache expiration time for a content item of an API request result a time value larger than or equal to a predefined cache expiration threshold value. This time value may be close or equal to the technically maximal possible value (e.g., largest integer value). This way, the content item may be cached on the caching system until it is really outdated. No accidental updates may be triggered due to requests for the content item due to browser/client requests.

According to another optional embodiment, the method may comprise sending—in particular, to the client from the caching system—as cache expiration time for a content item a time value larger than or equal to a predefined cache expiration threshold value, e.g. close or equal to the technically maximal possible value. Thus, the client/browser assumes that the validity time of the content item is more or less unlimited until a difference of seed values it determined at the caching system.

According to one further enhanced embodiment, the method may also comprise pushing—in particular by the CMS server to the client bypassing the cache server—using push technologies—e.g., web sockets—a notification indicative of an update of a seed value relating to one of the content items of a group. Due to the mechanics of the push technology, the client may receive the notification and determine that the seed value may have been expired. Now, the client may request an updated version of the content item from the cache system together with the newly received related seed value. The caching system may determine that the seed values of the cached content item and the one received with the API request are different. Based on this, the caching system may request the updated content item with the new seed value from the content management server.

According to one practical embodiment of the method, the content item may be an element of an SPA or otherwise dynamically generated content. In this context, the here proposed concept may unfold its complete set of advantages.

According to another practical embodiment of the method, the API request result may be a result of a search query. This may represent a common use case for the proposed concept. However, the content item may also be delivered and be managed by a streaming analytic or a business intelligence and reporting system.

According to one embodiment, the method may also comprise, prior to the caching one of the content items of the group together with the related seed value in a caching system, receiving the API request at the caching system—in particular from the client—and requesting the API request result, in particular from the CMS. This way, the loop can be closed and outdated content items may never be delivered to and used by the client.

According to another enhanced embodiment of the method, any of the seed values of content types may be requestable, in particular from the caching system or the CMS, or an independent supporting system handling seed values for, e.g., a plurality of content items of different CMS or search systems.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Embodiments of the disclosure will be described, by way of example only, and with reference to the following drawings.

DETAILED DESCRIPTION

In the context of this description, the following conventions, terms and/or expressions may be used:

The term 'cachability' may denote the characteristic of a content item to be cached in a more efficient way than in the originating systems; i.e., it may represent the a ability of a system to store data—in particular data for webpages and even more specifically for single page applications—such that they can be made accessible faster. The system and focus in the context of this document is a caching system which may allow reducing the network traffic from a client system to a content storage back-end system (and therefor also reducing the load on the back-end server). The caching system may only request a specific content item from the content storage back-end system—e.g., a content management system—for a delivery to a client system if it is clear that the content item currently stored, i.e., cached, on the caching system is outdated.

The term 'API request result' may denote a system answer in response to a function call to an application programming interface (API).

The term 'content delivery system' may denote any single core distributed system storing content items of any kind. This may be a content management system, a transactional system or a combination of both.

The term 'unique seed value' may denote a numerical value unique for a specific class or group of content items. Instead of the numerical value, also alpha-numerical value or any other digital pattern may be used. One example for the unique seed value—or simply seed value—may be a version number of a single content item. However, the here proposed concept is based on a group of content items such that the unique seed value may be changed if one of the content items in the group may be changed. The group may comprise all content items of a specific type in a content management system (or a combination of the plurality of content management systems), or it may be a sub-group of content items of a specific type, or even a group of content items of different types organized according to a subject.

The term 'content type' may denote a data type of a content item. Typical content types comprise, but may not be limited to text, image, sound, video and combinations thereof. However, any structured, semi-structured and so-called unstructured data may be used. Specifically, a group may comprise all content items of one content type.

The term 'caching' may denote an intermediate storage of data to ensure a fast accessibility. The storage of the data may typically be performed closer to a data sink.

The term 'API request' may denote a function call addressing an application programming interface in order to trigger a response. Typically, the response is a set of data. An API request comprises typically one or more parameters specifying the set of data to be received back.

The term 'parameter' may denote here a parameter in the sense of a function call, i.e., a variable as part of an API request. A specific parameter may be a seed value of a content item, e.g., displayed in a browser of a client system, indicating a specific version of the content item that is currently available or shared newly being requested in/for the client system.

The term 'XOR function' may denote a bit operation delivering a true output if exclusively one of the input bits is logical "1" and the other input bit is logical "0", a.k.a., "an exclusive or". The exhaust function may also be applied to longer sequences of bits (e.g., a byte) in which case the function is typically performed bitwise. Alternatively, a hash function may be used.

The term 'cache expiration threshold value' may denote a numerical value—also implementable as timestamp—after which a cached content item may be expired, i.e., no longer actual or outdated.

The term 'single page application' (SPA) may denote a web application or website that interacts with a user by dynamically rewriting a subset of a webpage rather than loading the entire new webpage from a server if only a small portion is updated. This approach may avoid an interruption of the user experience between successive pages (or parts of the pages), making the application behave more like a desktop application. In an SPA necessary code—e.g., HTML, JavaScript, and CSS (cascading style sheets)—is retrieved with a single page load, or the appropriate resources, i.e., content items, are dynamically loaded and added to the page as necessary, usually in response to a user action. The page is not reloaded at any point in the process, nor does control be transferred to another page. An interaction of a user with this single page application may often involve dynamic communication with the Web server behind the scenes.

The term 'middle layer' may denote a sandwiched system between a content management back-end system and a client system, i.e., in the context of this document the caching system.

The term '3-tier-content delivery system' may denote an architecture for delivering content items from a content storage system to a client via a middle layer of networks and caching systems.

The term 'content management system' (CMS) may denote a combination of a hardware system and software components enable it to manage the creation and modification of digital content, i.e., content items. These systems typically support multiple users in a collaborative environment allowing to perform document management with different styles of governance and workflows. In the context of this document, typically content items are managed by the CMS which may be dedicated for single page applications. Another characteristic of the CMS is a separation between content creation, publishing and presentation of the content items.

The term 'client' may denote an end point system in a digital network serving as user interface to access information and services from a network of other systems, e.g., caching systems, network servers, back-end systems, storage systems and so on. Examples of client systems comprise a personal computer, a workstation, a tablet computer, a mobile phone or any other mobile or especially dedicated device. In this sense, also a camera with a receiver or a screen in a car with related computing resources may be a client.

The term 'content delivery network' (CDN) or content distribution network may denote a geographically distributed network of proxy servers and their related data centers. The goal may be providing high availability and high performance by distributing the service spatially related to end-users. Thus, a specific group of users may primary receive its requested content from a specific data center and only exceptionally from a backup data center. The data centers may deliver digital content in the form of downloadable objects like media files, software, documents, applications, live streaming data, on-demand streaming data, access to social media sites, and so on.

In the following, a detailed description of the figures will be given. All instructions in the figures are schematic. Firstly, a block diagram of an embodiment of the computer-implemented method for improving cachability of an API request result of a content delivery system is given. Afterwards, further embodiments, as well as embodiments of the caching system for improving cachability of an API request result of a content delivery system, will be described.

Figure 1:
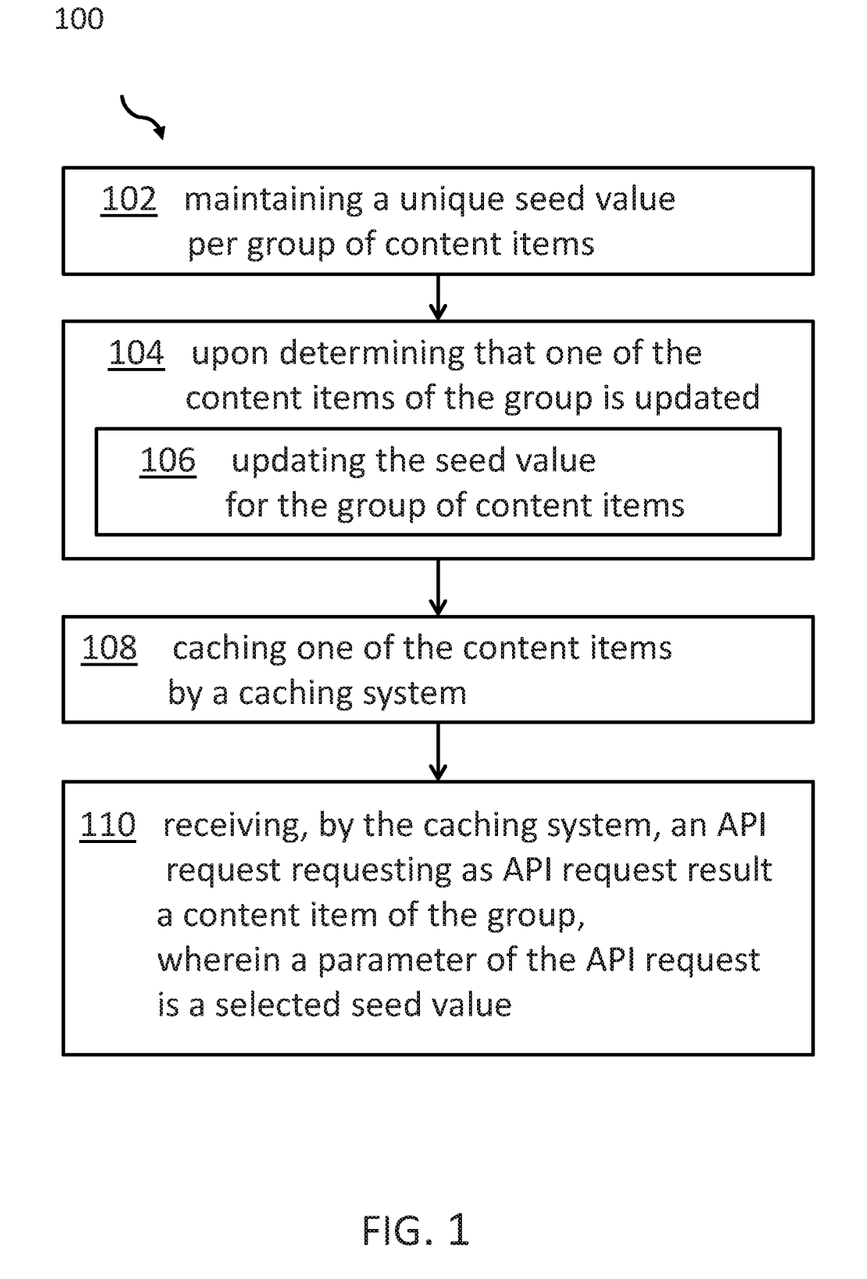
FIG. 1 shows a block diagram of an embodiment of the computer-implemented method for improving cachability of an API request result of a content delivery system.

FIG. 1 shows a block diagram of a preferred embodiment of the computer-implemented method 100 for improving cachability of an API request result of a content delivery system. The content delivery system may be implemented in different layers: the back-end server, the middle layer for caching, and the information consumer layer, i.e., the client. Hence, the content delivery system is adapted for supplying content to a client system. The method comprises maintaining, 102, a unique seed value per group of content items of a content type. A content type may—in a simple form—relate to all text content items in the content delivery system, and in a more complex implementation, a content type (comprising potentially also sub-types) may comprise either a subset of a content type (e.g., text in a certain format or relating to a specific overarching subject) or may relate to different simple content types and focus on a content subject (e.g., reports, images, video clips relating to a specific conference). Content types may comprise text (subtypes of the text type may comprise different formats for the text, e.g., in PDF-format, in TXT-format, in HTML-format, in OpenDocument-format, etc.), pixel graphic or vector graphic, sound files, video streams, as well as results from a search engine, a database, etc.

The method 100 also comprises updating, 106, the seed value for the group of content items (e.g., similar to a version number or a hash value) if it is determined, 104, that one of the content items of the group has been updated.

The method 100 also comprises caching, 108, one (i.e., at least one) of the content items of the group together with the related seed value in a caching system. At this point, the content item may be any data digestible by a client system (typically in a browser; but also any other data receiving application), i.e., static content, dynamic content, list of search results, and the like. The caching system may be part of the CDN, i.e., a related distribution server. However, it may also be noted that the distribution server may also be implemented as a service of the hardware system executing also the back-end CMS system. This may depend on a specific implementation of configuration or the CDN.

Moreover, the method 100 also comprises, 110, by the caching system, an API request—in particular from the client/the related browser—requesting as API request result a content item of the group, wherein a parameter of the API request is a selected seed value. This parameter being used to indicate the selected seed value would be seen as an extension to normal already existing API calls between clients and CDNs. If traditional API calls are used, the seed value per meter would be missing, implying that the caching server would behave as under traditional conditions. Thus, the newly proposed method may be used in traditional, as well as, computing environments supporting the here proposed concept. A technical conflict would not be generated in any case.

Figure 2:
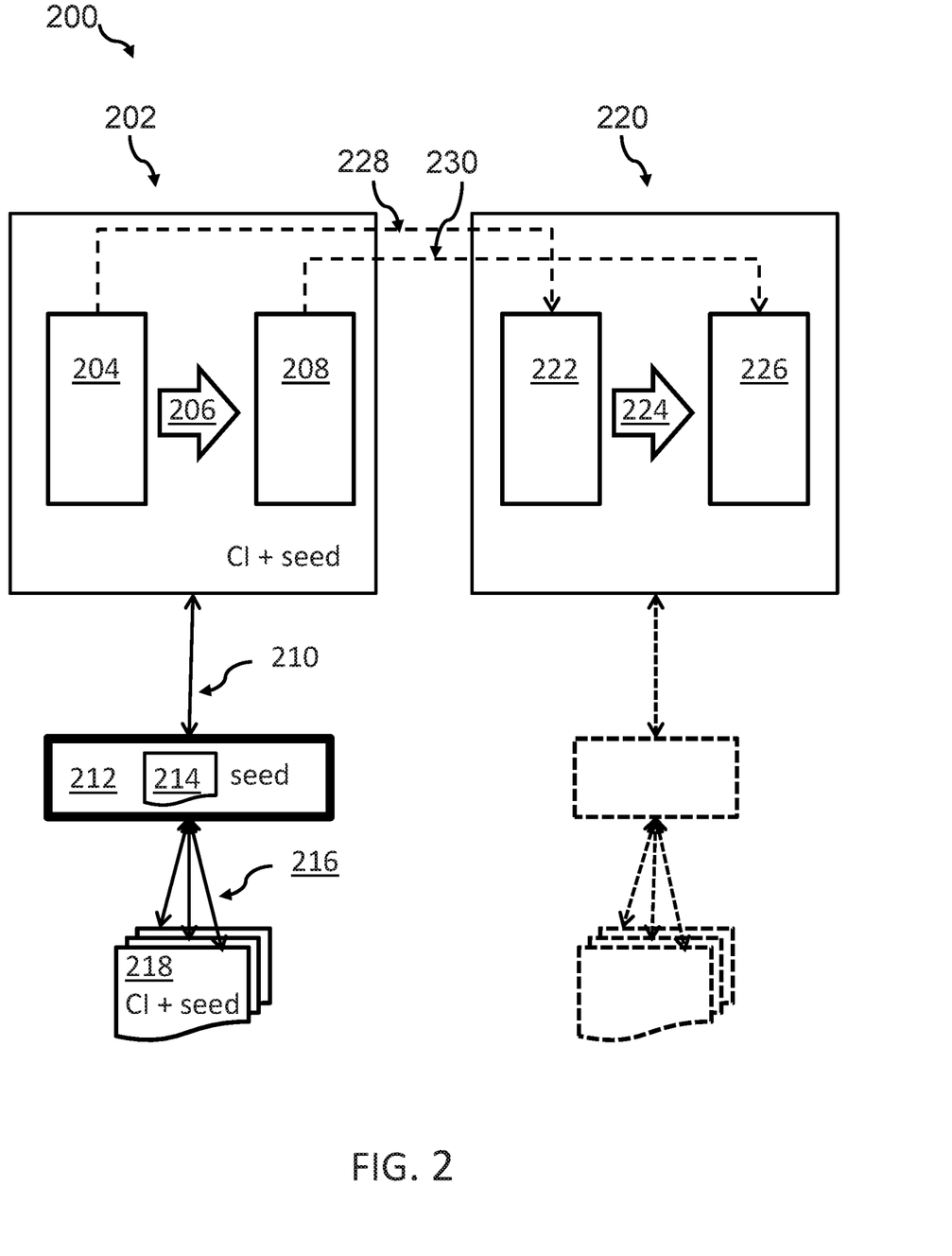
FIG. 2 shows a block diagram of an embodiment with two CMSs in different data centers, a cache system and clients.

FIG. 2 shows a block diagram of an embodiment with two CMS in different data centers, a cache system 212 and a plurality of client systems 218. The content delivery network may exemplary comprise a first data center 202 and a second data center 220. Both data centers 202, 220 comprise each a content management system (not shown), each having an authoring component 204, 222 and a delivery component 208, 226. If a content item (not shown) is created or updated, it can be published, 206, 224 from the respective authoring system 204, 222 to the respective delivery system 208, 226. Each created or updated content item (CI) or a group the content items belongs to has a related seed value. A created content item may have the seed value 1234 for a specific content item group. If the content item may be updated (i.e., changed) the seed value may likewise be updated, e.g., to a value 1235.

A corresponding content item may be present in the second data center 220. Special services may facilitate a synchronization between the authoring component 204 and the authoring component 222 (compare reference numeral 228), as well as, between the delivery component 208 and 226 (compare reference numeral 230). The seed value for the not yet updated content item in the second data center 220 may, e.g., be 9876, and after an update 9877. The synchronization between the components may indicate that a specific content item may have been changed. Based on this, the seed value in the second data center for the related content item may change the seed value autonomously.

Additionally, FIG. 2 shows a caching server 212 as part of the CDN adapted for caching a specific content item 214 and its related actual seed value. If a client system 218 requests via an API call and via the network connection 216 a specific content item from the caching system 212, and the specific content item is not available in the caching system 212, the caching system 212 forwards the request (via an API call) to the content item from the CMS in the first data center via the network connection 210.

For this—for the purpose of updating a portion of an SPA—the client system 218 requests the content item together with a specific seed value as additional parameter in the API request. If the seed value in the API request and the seed value of the content item 214 in the caching system 212 are identical, nothing has to be done in respect to the back-end system. The caching system simply returns the seed value back to the client. If the two seed values differ, the caching system 212 forwards the request to the back-end system (i.e., CMS) and updates the content item from the content management system from the data center 202. Thus, normally, network traffic is dramatically reduced.

The general idea is to keep track of seed values per classification of content items, i.e., per group and/or content type. The seed value needs to encode the data center ID and classification information. A simple form of classification may be done by a single lowercase letter: c=content, a=asset, and =layout-mapping, t=type, i=image-profile, small o=other. Thus, a request for a content item A from a Washington data center may comprise the seed value wdc: c:1234; likewise a seed value from the Frankfurt assets data center would be encoded as fra:a:5678. In order to compute aggregated seed values, an XOR function may be used. If all contributing lowercase letters are sorted in alphabetical order, a combined seed value for assets and content would be (exemplary) fra:ac:9012. However, such format would not be made public to users that may be used as hidden seed values generated by a cache seed service.

This cache seed service may be accessible via a specific cache seed service API call. A call from a client system to load seed values may have the form:

GET/delivery/v1/seeds?classifications={classifications}

A JSON (JavaScript Object Notation) response may then contain a combined seed value for the given classifications, plus the individual seed values per classification.

---

E.g., /delivery/v1/seeds?classifications=content,asset,content-type
may return
{
"content": "fra: c: 1234",
"asset": "fra:a:354354",
"content-type": "fra:t: 3253466",
"combined":"fra:act 348767593":
}.

---

In another example for the cache seed service API would be a seed validation call (court by a dispatcher):

GET/delivery/v1/seed/validation/{seed-value}

A related JSON response comprises validation results. In case of a failure, the valid seed value is returned.

---

E.g., /delivery/v1/seeds/validation/ Classifications =wcd:ac:123456
may return
{
"valid": true
} or
{
"valid": false,
"value": "fra:ac: 32465231"
}.

---

At least three cases should be distinguished:

Case 1: Cache Miss on CDN

The client sends a cache seed value with the request and a cache miss happens on the CDN, e.g., the caching system 212. Then, a dispatcher, as part of the back-end server, (compare FIG. 3) can use the provided data center information in the seed value to check if the seed value was generated in the global data center. If the provided seed value matches the current seed value, the dispatcher can dispatch the API request as usual and set the configured edge-control cache headers (very long maximum age).

If the provided seed value does not match, the dispatcher calls the cache seed service to get a valid seed for the current data center (via/validate . . . ) and sends a redirect to the same URL just replacing the seed value with the current value. It may be noted that this should happen in very rare cases only (e.g., in case of a data center failover). This may ensure a avoiding servicing stage data for a more recent seed value for a specific content item (or a group of content items) generated in a different data center.

Case 2: Expired Seed Value on CDN

If a client 200 sends a cache seed value with the respective API request and there is an expired cache value on the CDN, the dispatcher can validate the data center info (as before) and, in case of a match, the dispatcher can safely skip the actual API call and return a 304 code "not modified" instead. As a result, the CDN is informed that the cache value is still good and the CDN would put it back into its expiration cache. Otherwise, a redirect command is sent (same as in the cache miss workflow above).

Case 3: Non-Expired Cache Hit on CDN

In this case, a result to the API request gets served from the CDN as usual.

Figure 3:
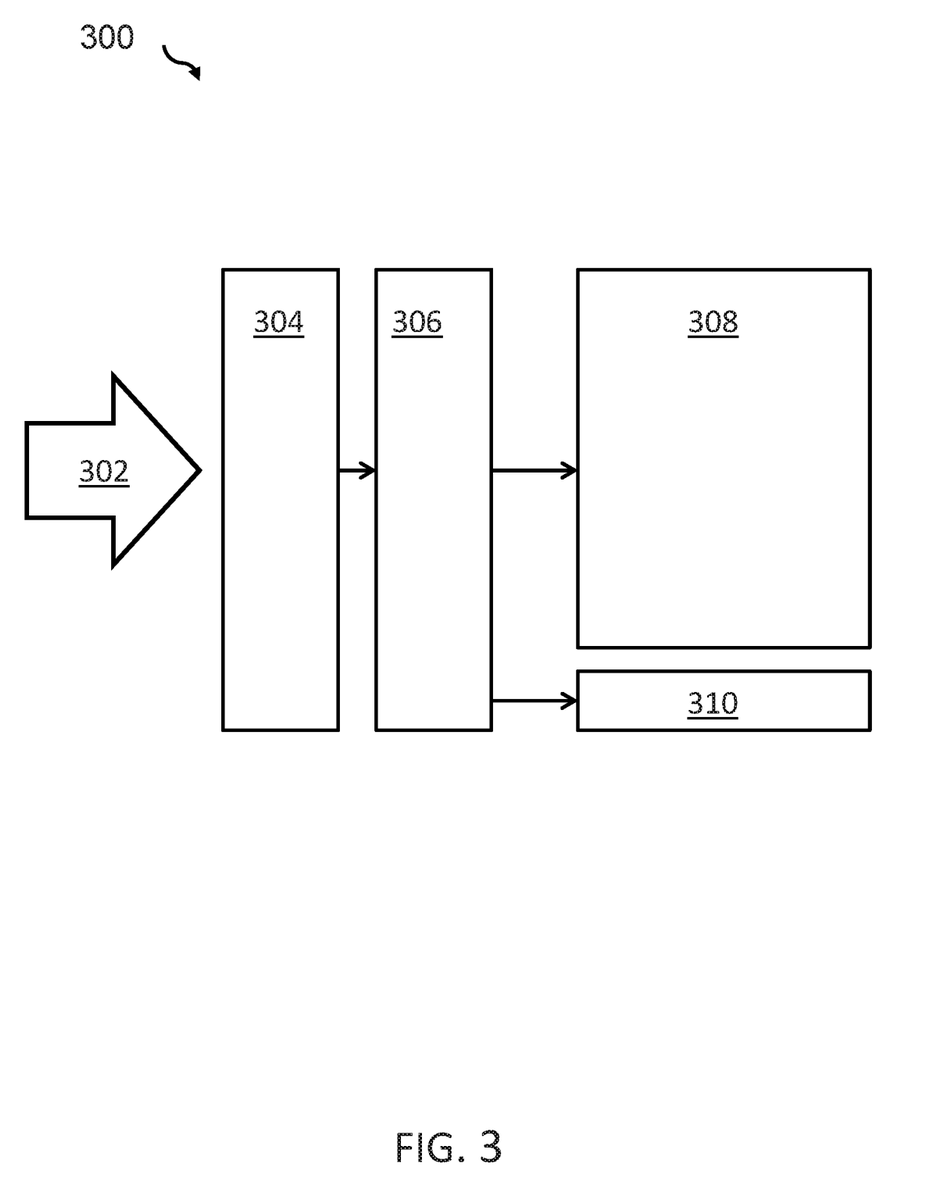
FIG. 3 shows a block diagram of an embodiment of a dataflow from a CDN to content service supported by a cache seed service.

FIG. 3 shows a block diagram 300 of an embodiment of a dataflow from a CDN to content service supported by a cache seed service 310. An API request may come in, 302, to the CDN managed by the component 304 which may exemplarily be an AKAMAI system (other CDN managing systems may be used as well). The CDN management component 304 sends the request to the back-end server. The back-end server comprises a dispatcher 306 from which the request is forwarded to a specific service 308 for delivering the content. In parallel, the dispatcher 306 contacts the cache seed service 310. If the data center info in the cache seed value does not match the current data center, the cache seed service is called and a respective redirect command is sent. Otherwise, the dispatching is performed as in traditional systems and a long max-age value is sent.

The cache seed management on the client-side may be performed as follows: all clients are free to ignore the cache seed concept and operate as traditional systems (caching remains as bad as with known systems). However, the current cache seed values for specific content items or classes thereof are available via a public API call. The cache seed values are also made available in the "page" rendering context, such that succeeding request can use a valid seed value. The client is free to re-load the seed values at appropriate times, e.g., at regular time intervals (e.g., every minute), or be triggered by a refresh button operated by a user.

A data center transition—admittedly a rare case—would be handled by the CDN management component 304. However, in a typical flow, requests of a given client may always be directed to the same data center. Seed values obtained from the first data center will not be valid at the second data center even if they are still valid; as a result, the client may get a redirect to the second data center version of the current seed value (in the above example from the first data center DC1:c:12352 DC":C9877).

In case a content item is not updated for long periods in which the content items on caching systems remain stable which means that the caching system may not require an update of the content item in the caching system from the CMS. Hence, after a while, almost all API calls should result in CDN cache hits (i.e., the content items are found in the caching systems).

The client system can also control how often to validate the seed values by a specific call. As a result, and when the most current seed value is used as parameter in the respective API request, the maximum latency is the published latency (max-age).

Figure 4:
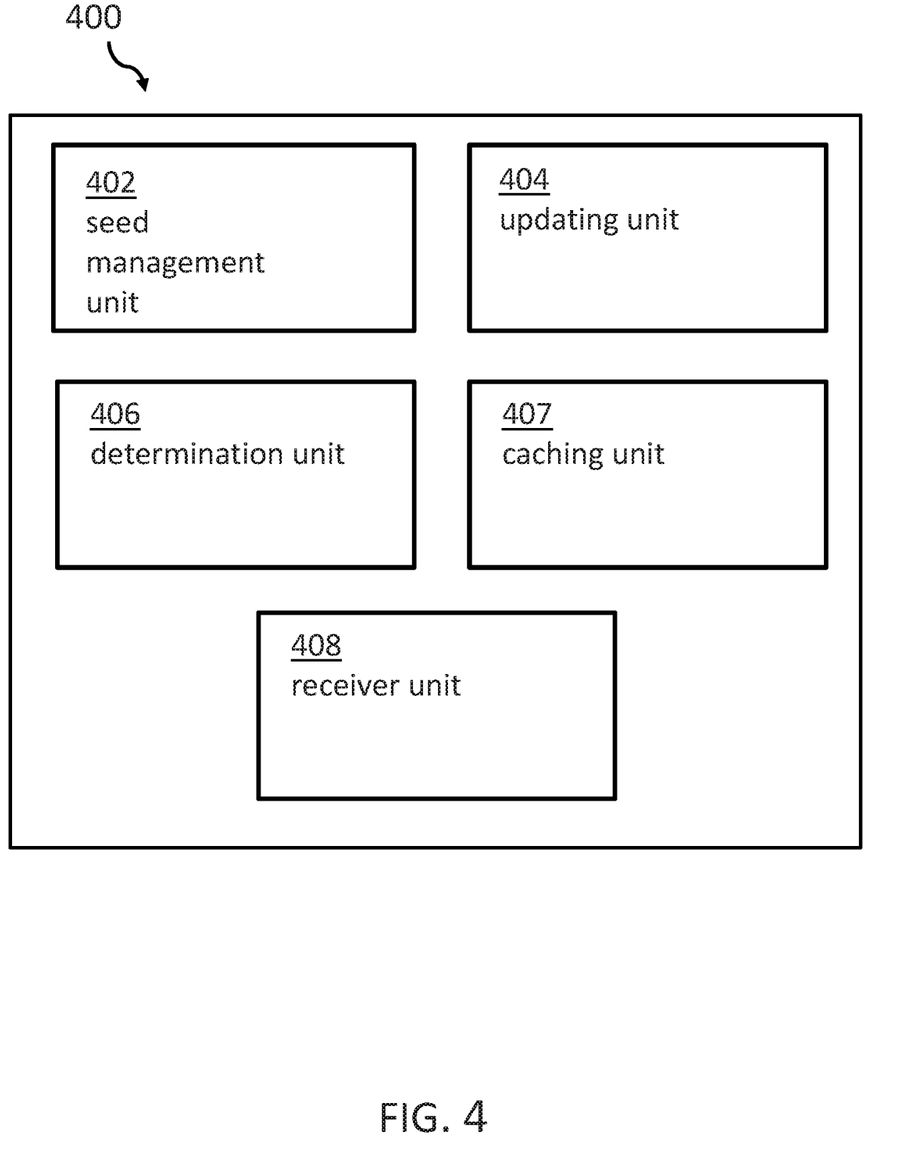
FIG. 4 shows a block diagram of an embodiment of the caching system for improving cachability of an API request result of a content delivery system.

FIG. 4 shows a block diagram of an embodiment of the caching system 400 for improving cachability of an API request result of a content delivery system. The content delivery system is also here adapted for supplying content to a client system. the caching system comprises means—in particular, a seed management unit (or module) 402 adapted—for maintaining a unique seed value per group of content items of a content type, and means—in particular, updating unit (or module) 404 adapted—for updating the seed value for the group of content items, upon determining—by determination unit (or module) 406—that one of the content items of the group is updated.

Furthermore, the caching system 400 comprises means—in particular, a caching unit (or module) 407 adapted—for caching one of the content of the group together with the related seed value in a caching system, and means—in particular, a receiver unit (or module) 408 adapted—for receiving, by the caching system, an API request requesting as API request result a content item of the group, wherein a parameter of the API request is a selected seed value.

Embodiments of the disclosure may be implemented together with virtually any type of computer, regardless of the platform being suitable for storing and/or executing program code.

Figure 5:
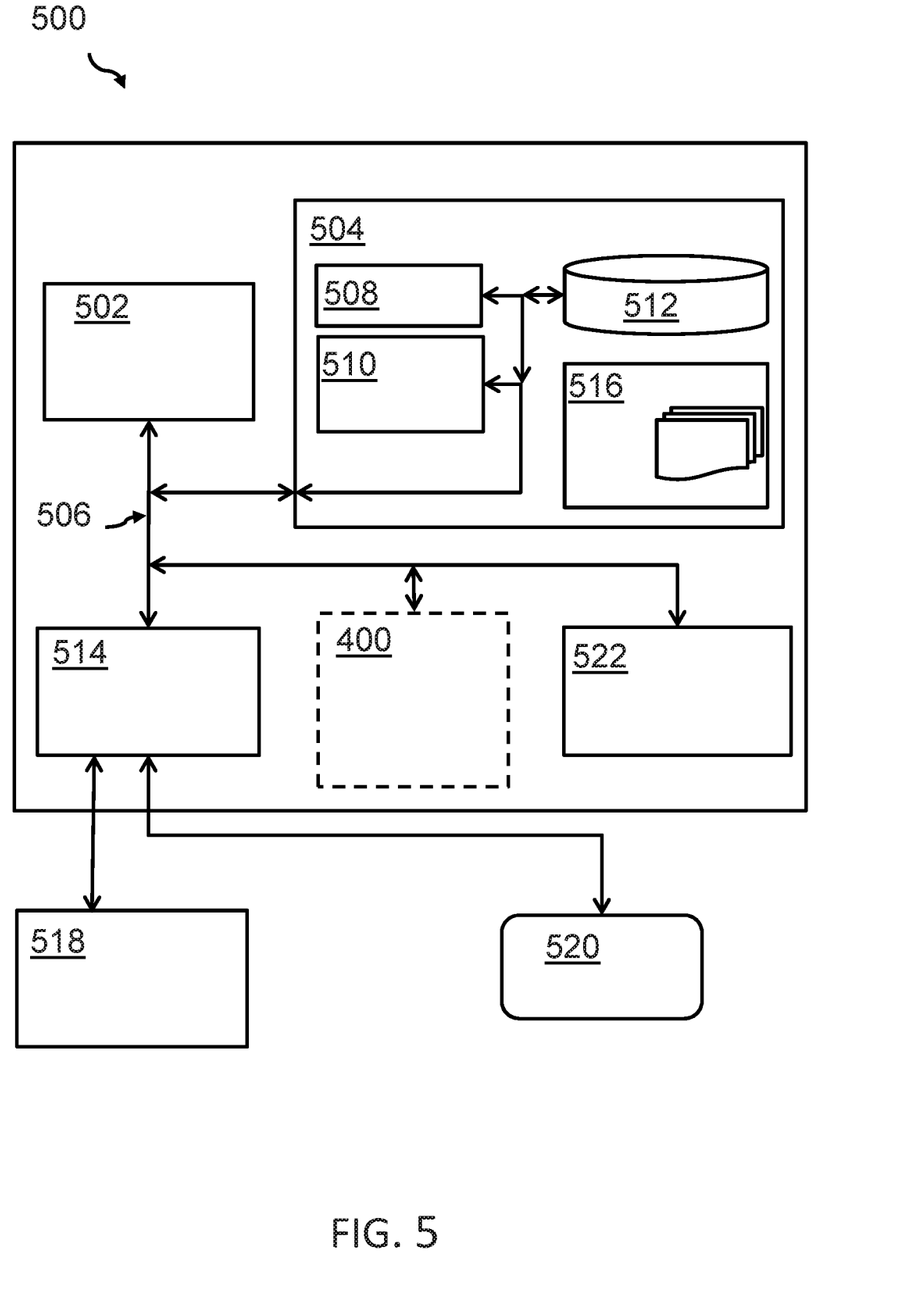
FIG. 5 shows an embodiment of a computing system comprising the caching system according to FIG. 4.

FIG. 5 shows, as an example, a computing system 500—in particular a caching system—suitable for executing program code related to the proposed method.

The computing system 500 is only one example of a suitable computer system, and is not intended to suggest any limitation as to the scope of use or functionality of embodiments of the disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the disclosure.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the caching system 400 for improving cach-ability of an API request result of a content delivery system may be attached to the bus system 506.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A computer-implemented method for improving cachability of an application programming interface (API) request result of a content delivery system adapted for supplying content to a client system of a single page application (SPA), the method comprising:
   maintaining, at a data center adapted for providing latest versions of content items to the SPA for dynamically rewriting a subset of a webpage, a unique seed value per group of content items of a specific type, wherein the unique seed value identifies the group of content items managed at the data center as latest versions and includes a data center identification for the data center;
   updating, at the data center, the seed value for the group of content items upon determining that one of the content items of the group of content items is updated, wherein the seed value is updated with a new unique value that identifies the group of content items managed at the data center as latest versions, and the new unique value is combined with the data center identification for the data center to form an updated seed value for the group of content items;

caching at least one of the content items of the group of content items together with the updated seed value in a caching system; and receiving, by the caching system, an API request from the SPA requesting as an API request result a content item of the group of content items, wherein a parameter of the API request is a selected seed value.

2. The method according to claim 1, further comprising:
requesting an updated respective content item as an API request result upon determining, at the caching system, a difference between the seed value and the selected seed value.

3. The method according to claim 1, further comprising:
receiving regularly, at the caching system, an API request for the content item of the group of content items, wherein regularly means at regular time intervals or when triggered by events received by the client system.

4. The method according to claim 1, further comprising:
using, at the caching system, as cache expiration time for a content item of an API request result, a time value larger than or equal to a predefined cache expiration threshold value.

5. The method according to claim 1, further comprising:
sending, as cache expiration time for a content item, a time value larger than or equal to a predefined cache expiration threshold value.

6. The method according to claim 1, further comprising:
pushing a notification to the client system, the notification being indicative of an update of a seed value relating to one of the content items of a group of content items.

7. The method according to claim 1, wherein the API request result is a result of a search query.

8. The method according to claim 1, further comprising, prior to the caching of the at least one of the content items of the group together with the seed value in a caching system:
receiving the API request at the caching system; and
requesting the API request result.

9. The method according to claim 1, wherein any of the seed values of specific types are requestable.

10. The method according to claim 1, wherein:
specific types of content items are based on subject matter and/or content type; and
the content type is selected from a group comprising: text, image, sound, video, text format, graphic format, stream, search result, database result, asset, layout, and size.

11. The method according to claim 1, wherein the parameter of the API request is a result of an exclusive or (XOR) function having seed values of different types as input.

12. The method according to claim 11, wherein the XOR function is only performed on a portion of the seed values that classify the different groups of content item types.

13. The method according to claim 1, wherein the content item of the API request is an element of the SPA.

14. The method according to claim 13, further comprising dynamically rewriting a subset of the SPA when one of the content items of the group of content items is updated.

15. A caching system for improving cachability of an application programming interface (API) request result of a content delivery system adapted for supplying content to a client system of a single page application (SPA), the caching system comprising:
one or more computer readable storage media storing program instructions and one or more processors which, in response to executing the program instructions, are configured to:
maintain, at a data center adapted for providing latest versions of content items to the SPA for dynamically rewriting a subset of a webpage, a unique seed value per group of content items of a specific type, wherein the unique seed value identifies the group of content items managed at the data center as latest versions and includes a data center identification for the data center;
update, at the data center, the seed value for the group of content items, upon determining that one of the content items of the group is updated, wherein the seed value is updated with a new unique value that identifies the group of content items managed at the data center as latest versions, and the new unique value is combined with the data center identification for the data center to form an updated seed value for the group of content items;
cache at least one of the content items of the group of content items together with the updated seed value in the caching system;
receive, by the caching system, an API request from the SPA requesting as an API request result a content item of the group, wherein a parameter of the API request is a selected seed value.

16. The caching system according to claim 15, wherein the client system is configured to request an updated respective content item as the API request result, upon determining, at the caching system, a difference between the related seed value and the selected seed value.

17. The caching system according to claim 15, wherein a cache expiration time for a content item of an API request result is a time value larger than or equal to a predefined cache expiration threshold value.

18. The caching system according to claim 15, wherein the caching system is configured to send, as cache expiration time for a content item, a time value larger than or equal to a predefined cache expiration threshold value to a client.

19. The caching system according to claim 15, wherein the caching system represents a middle layer of a 3-tier-content delivery system comprising a content management system, a cache server and a client.

20. A computer program product for improving cachability of an API request result of a content delivery system adapted for supplying content to a client system of a single page application (SPA), said computer program product comprising a non-transitory computer readable storage medium having program instructions embodied therewith, said program instructions being executable by one or more computing systems or controllers to cause said one or more computing systems to:
maintain, at a data center for providing latest version of content items to the SPA for dynamically rewriting a subset of a webpage, a unique seed value per group of content items of a specific type, wherein the unique seed value identifies the group of content items managed at the data center as latest versions and includes a data center identification for the data center;
update, at the data center, the seed value for the group of content items upon determining that one of the content items of the group of content items is updated, wherein the seed value is updated with a new unique value that identifies the group of content items managed at the data center as latest versions, and the new unique value is combined with the data center identification for the data center to form an updated seed value for the group of content items;

cache at least one of the content items of the group of content items together with the updated seed value in a caching system; and receive, by the caching system, an API request from the SPA requesting as an API request result a content item of the group of content items, wherein a parameter of the API request is a selected seed value.

* * * * *